3,212,911
TITANIUM DIOXIDE PIGMENTS
Gregor Berstein, Newton Center, and Robert G. Nuttle, Bedford, Mass., assignors to Cabot Corporation, Boston, Mass., a corporation of Delaware
No Drawing. Filed Sept. 18, 1961, Ser. No. 138,616
9 Claims. (Cl. 106—300)

This invention relates to the production of titanium dioxide and in particular titanium dioxide suitable for use as a pigment.

Pigment grade titanium dioxide is an extremely important commercial product. A recent but increasingly important method of producing pigment grade titanium dioxide comprises the vapor phase oxidation or hydrolysis at elevated temperatures of a vaporizable titanium halide, such as titanium tetrachloride. However, titanium dioxide produced by vapor phase processes, sometimes referred to as "pyrogenic" titanium dioxide, prior to aftertreatment is generally more difficult to disperse in liquids, plastics, etc. than titanium dioxide produced by other processes because pyrogenic titanium dioxide has a more pronounced tendency to agglomerate. This characteristic is particularly distressing not only to the industrial uses of the titanium dioxide but also to the producer who must often disperse the newly produced titanium dioxide pigment in solutions of one type or other in order to effect chemical aftertreatment, the success of which treatment is usually highly dependent upon the extent to which the titanium dioxide is dispersed in the aftertreating solution.

Accordingly, it is a principal object of the present invention to produce an improved pyrogenic titanium dioxide pigment.

It is another object of the present invention to provide an improved process for aftertreating pyrogenic titanium dioxide in solution.

It is another object of the present invention to produce pyrogenic titanium dioxide that is more readily dispersible in liquid and plastic media.

Other objects will in part be obvious and will in part appear hereinafter.

It was discovered in accordance with the present invention that pyrogenic titanium dioxide can be rendered more dispersible in liquid or plastic media by subjecting an aqueous dispersion of said titanium dioxide to mechanical attrition in the presence of a minor amount of an alkali metal silicate, aluminate or titanate. In addition, it has been determined that subjection of the titanium dioxide to mechanical attrition in the absence of said alkali metal compounds or the addition of said alkali metal compounds alone has little effect upon the dispersibility of the titanium dioxide pigment in liquid or plastic media.

Although this phenomenon is not completely understood, it is believed, although there is no intention to be bound by this explanation, that the use of mechanical attrition in the presence of said alkali metal compounds causes agglomerated particles to become deagglomerated and protected from reagglomeration by a precipitate of hydrous oxide which forms on the surfaces of the deagglomerated particles.

In accordance with the present invention, the alkali metal compounds should be utilized in quantities sufficient to provide the equivalent of between about 0.1 and about 1%, and preferably between about 0.2 and about 0.5%, by weight of $SiO_2$, $Al_2O_3$, $TiO_2$ or mixtures thereof on the weight of the pyrogenic titanium dioxide pigment to be treated. The alkali metal compounds are preferably provided in the form of dilute, i.e. less than 10%, aqueous solutions. However, if desired, the alkali metal compounds can be added directly to the aqueous dispersion of pyrogenic titanium dioxide to be treated. Since, however, aqueous solutions are so readily produced and utilized, the use thereof is greatly preferred.

Mechanical attrition for the purposes of the present invention can be accomplished in any suitable manner, for example, by ball or pebble milling, or by means of a colloid mill, particularly of the rotor and stator type. It has been found that simple mechanical agitation as for example with a propeller type mixer does not produce the excellent results achieved by the use of the mechanical shear devices mentioned above.

Subsequent to treatment with alkali metal compounds as outlined above, the titanium dioxide can be readily aftertreated in any well known manner to deposit on the surface thereof alumina and/or titania. For example, 0.1 to 5% by weight alumina can be deposited on the surface of titanium dioxide which is dispersed in an aqueous solution of aluminum sulfate containing between about 1 and about 17% by weight $Al_2(SO_4)_3$ by treating said solution with calcium carbonates until a pH value of above about 8 is reached.

The particular process by which the pyrogenic titanium dioxide is produced is not critical so long as the titanium dioxide produced is between about 200 and 400 millimicrons in average particle diameter. Pyrogenic titanium dioxides are currently produced by flame hydrolysis and/or oxidation of volatile titanium halides, such as $TiCl_4$. Suitable processes for this and other reactions have been disclosed, for example, in United States Patents 2,488,439, 2,488,440 and 2,980,509.

There follow a number of illustrative, non-limiting examples: In these examples, the improvement in dispersion is indicated by measuring the improvement in tinting strength of the dispersion, it being generally well known in the art that for a given titanium dioxide having a given particle size distribution, tinting strength is a measure of how well the titanium dioxide is dispersed.

It is pointed out that it has been repeatedly demonstrated that the improvement in the dispersibility of the titanium dioxide which occurs when it is treated in accordance with the process of the present invention is a long term effect, that is, when the titanium dioxide is removed from the liquid medium and redispersed in liquid media (in a given manner) dispersions duplicating the improvement achieved in the original dispersion are achieved. Although the improvement in dispersibility is not permanent, its life expectancy being on the order of weeks, the effect lasts sufficiently long to readily allow further treatments of the titanium dioxide.

Example 1

100 grams of a titanium dioxide, which had been produced by the oxidation of titanium tetrachloride in the vapor phase at elevated temperatures, and which had an average particle diameter of about 206 millimicrons, was dispersed by simple mechanical agitation provided by stirring in 83.2 grams of water. The resulting dispersion was then divided into five equal parts which were treated as follows:

Part 1: was the control and was not treated further
Part 2: was pebble milled for 2 hours
Part 3: there was stirred into this sample, 4.67 grams of an aqueous solution containing 0.25 gram of sodium silicate ($Na_2O \cdot 3.33SiO_2$)
Part 4: was first pebble milled for 2 hours; after which, there was stirred into this sample 4.67 grams of the same aqueous solution added to Part 3
Part 5: there was added thereto 4.67 grams of the same solution added to Part 3 and the resulting mixture was then pebble milled for 2 hours The tinting strength of each of the resulting dispersions was then measured using the Reynolds constant volume ultramarine method described in "The Handbook" published in 1955 by Pigment Corporation of New York, pp. 89–92. The results were as follows:

| | Tinting strength |
|---|---|
| Part 1 | 1500 |
| Part 2 | 1525 |
| Part 3 | 1625 |
| Part 4 | 1650 |
| Part 5 | 1725 |

*Example 2*

100 grams of a titanium dioxide (which, due to substantial agglomeration had a tinting strength of below the general acceptable market standards for a pigment), i.e. below about 1700 which had been produced by the vapor phase hydrolysis of a titanium halide at elevated temperatures, and which had an average particle diameter of about 206 millimicrons was dispersed by simple mechanical agitation provided by stirring in 300 grams of water. The resulting dispersion was then divided into five equal parts which were treated as follows:

Part 1: was the control and was not treated further
Part 2: was ball milled for 20 hours
Part 3: there was stirred into the sample 2.6 grams of an aqueous solution containing 0.076 gram of sodium meta aluminate
Part 4: was ball milled for 20 hours, *after which* there was stirred into the sample 2.6 grams of the same aqueous solution added to Part 3
Part 5: there was added thereto 2.6 grams of the same aqueous solution added to Part 3, and the resulting mixture was ball milled for 20 hours The tinting strength of each of the resulting dispersions was then measured and compared to the generally acceptable market standard of 1700.

The results were as follows:

| | Tinting strength |
|---|---|
| Part 1 | unacceptable |
| Part 2 | unacceptable |
| Part 3 | unacceptable |
| Part 4 | unacceptable |
| Part 5 | acceptable |

*Example 3*

500 grams of the same titanium dioxide utilized in Example 2 was dispersed in 1054 grams of water. There was stirred into this dispersion 65 grams of an aqueous solution containing 3.25 grams of sodium silicate and the resulting mixture was ball milled for 2 hours. There were then added to the resulting dipsersion 381 grams of water, followed by 185 grams of an aqueous aluminum sulfate solution containing 31 grams of $Al_2(SO_4)_3$. Next a 13% sodium carbonate was slowly added to the dispersion until a pH value of about 9 had been reached. The titanium dioxide pigment was then filtered, washed, dried and finally jet milled and was found to have 1.8% by weight alumina (in the form of aluminum hydroxide) on the surface thereof. The dispersibility of this aftertreated titanium dioxide is improved over that of the product of the sodium silicate-ball milling treatment above. Moreover, unlike said product, the dispersibility of this aftertreated titanium dioxide remains more or less stable indefinitely. Obviously many changes can be made in the above-identified procedures without departing from the scope of the invention. For example, although the only alkali metal compounds specifically mentioned above were sodium silicate ($Na_2O \cdot 3.33SiO_2$) and sodium meta aluminate, other alkali metal aluminates, silicates and titanates which are soluble in aqueous media are also generally suitable for the purposes of the present invention. Thus, potassium meta-silicate, potassium disilicate, and water glass are all suitable for the purposes of the present invention.

What we claim is:

1. A process for rendering pyrogenic titanium dioxide having an average particle diameter between about 200 and about 400 millimicrons more readily dispersible in liquid media comprising subjecting an aqueous dispersion of said titanium dioxide to mechanical attrition in the presence of a solution of a substance chosen from the group consisting of alkali metal silicates, aluminates, titanates and mixtures thereof in amounts sufficient to provide the equivalent of between about 0.1 and about 1% by weight, based on the weight of said pyrogenic titanium dioxide, of the corresponding oxide chosen from the group consisting of $SiO_2$, $Al_2O_3$, $TiO_2$ and mixtures thereof.

2. The process of claim 1 wherein said substance comprises a sodium silicate.

3. The process of claim 1 wherein said substance comprises a sodium aluminate.

4. The process of claim 1 wherein said substance comprises a sodium titanate.

5. The process of claim 1 wherein said substance comprises a potassium silicate.

6. The process of claim 1 wherein said substance comprises a potassium aluminate.

7. The process of claim 1 wherein said substance comprises a potassium titanate.

8. The process of claim 1 wherein the quantity of hydrous oxide deposited upon the titanium dioxide is between about 0.2 and 0.5% by weight on the weight of said titanium dioxide.

9. A process for aftertreating pyrogenic titanium dioxide having an average particle diameter between about 200 and about 400 millimicrons in order to deposit alumina on the surface thereof comprising subjecting an aqueous dispersion of the titanium dioxide to mechanical attrition in the presence of a solution of a substance chosen from the group consisting of alkali metal silicates, aluminates, titanates and mixtures thereof in amounts sufficient to provide the equivalent of between about 0.1 and about 1% by weight, based on the weight of said pyrogenic titanium dioxide, of the corresponding oxide chosen from the group consisting of $SiO_2$, $Al_2O_3$, $TiO_2$ and mixtures thereof, then dispersing the thus treated pyrogenic titanium dioxide in an aqueous solution of aluminum sulfate in amounts sufficient to provide the equivalent of between about 0.1 and 5% of alumina based on the weight of the pyrogenic titanium dioxide, then raising the pH of said solution to a value above about 8 so as to cause a deposit comprising alumina to form on the surface of said pyrogenic titanium dioxide, and recovering the resulting, modified titanium dioxide.

References Cited by the Examiner

UNITED STATES PATENTS

| 1,937,037 | 11/33 | Hanahan | 106—300 |
| 2,671,031 | 3/54 | Whately | 106—300 |
| 3,035,966 | 5/62 | Siuta | 106—300 |

FOREIGN PATENTS 476,439 8/51 Canada.

TOBIAS E. LEVOW, *Primary Examiner.*

JOHN H. MACK, *Examiner.*